United States Patent
Guy et al.

(10) Patent No.: US 7,082,425 B2
(45) Date of Patent: Jul. 25, 2006

(54) REAL-TIME SEARCHING OF DATA IN A DATA STREAM

(75) Inventors: Gideon Guy, Chatsworth, CA (US); Eugenio Allevato, Northridge, CA (US)

(73) Assignee: Logicube, Chatsworth, CA (US)

( * ) Notice: Subject to any disclaimer, the term of this patent is extended or adjusted under 35 U.S.C. 154(b) by 556 days.

(21) Appl. No.: 10/458,555

(22) Filed: Jun. 10, 2003

(65) Prior Publication Data

US 2004/0255073 A1   Dec. 16, 2004

(51) Int. Cl.
*G06F 17/30* (2006.01)
(52) U.S. Cl. .............................. 707/3; 707/10; 707/203
(58) Field of Classification Search .............. 707/1–10, 707/100–104.1, 200–205
See application file for complete search history.

(56) References Cited

U.S. PATENT DOCUMENTS

| | | | |
|---|---|---|---|
| 4,068,301 A | 1/1978 | Ishino et al. | |
| 4,760,523 A | 7/1988 | Yu | |
| 5,086,498 A * | 2/1992 | Tanaka et al. | 709/236 |
| 6,057,849 A * | 5/2000 | Haubner et al. | 345/428 |
| 6,269,174 B1 * | 7/2001 | Koba et al. | 382/107 |

\* cited by examiner

*Primary Examiner*—Mohammad Ali
(74) *Attorney, Agent, or Firm*—SoCal IP Law Group LLP; Mark A. Goldstein (57) ABSTRACT

Systems, methods, and devices for real-time searching are disclosed. A method comprises receiving a real-time data stream comprised of a plurality of characters and placing the characters in shift registers, the shift registers holding a current term. During each clock cycle of the data stream, the current term is evaluated to determine whether it matches any terms in a dictionary of terms, including indexing a plurality of look-up tables with the characters in each of the shift registers. A match data is output based on the evaluating. The method may be implemented in hardware in a computer forensic device, a controller, a computing device, and in other devices.

13 Claims, 6 Drawing Sheets

| Index | Found |
|-------|-------|
| A | 0 |
| B | 0 |
| C | 0 |
| D | 0 |
| E | 0 |
| F | 0 |
| G | 0 |
| H | 0 |
| I | 0 |
| J | 0 |
| K | 0 |
| L | 1 |
| M | 0 |
| N | 0 |
| O | 0 |
| ... | ... |

| Index | Found |
|-------|-------|
| A | 1 |
| B | 1 |
| C | 1 |
| D | 1 |
| E | 1 |
| F | 1 |
| G | 1 |
| H | 1 |
| I | 1 |
| J | 1 |
| K | 1 |
| L | 1 |
| M | 1 |
| N | 1 |
| O | 1 |
| ... | ... |

REAL-TIME SEARCHING OF DATA IN A DATA STREAM

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The invention relates to real-time searching of data in a data stream.

2. Description of Related Art

Computers have become ubiquitous in modem society. Computers typically include a hard disk or other writeable storage medium to store data. When a computer is used for criminal purposes, evidence of the offender's criminal acts may be stored on the hard disk. Investigative agencies such as police, secret service, district attorney, Federal Bureau of Investigation and other organizations may obtain a suspect's computer as evidence of criminal activity. In such circumstances, data on the hard disk of the suspect's computer is examined for evidence of malicious acts.

Before data on a suspect's hard disk is examined, a copy of all of the data from the suspect's hard disk is made. The data from the suspect's hard disk may be transferred in a bit stream to an investigator's hard disk. The copy of the hard disk is then analyzed for evidence of a criminal or other offensive act.

DETAILED DESCRIPTION OF THE INVENTION

Throughout this description, the embodiments and examples shown should be considered as exemplars, rather than limitations on the apparatus and methods of the invention.

The Systems and Devices

Figure 1:
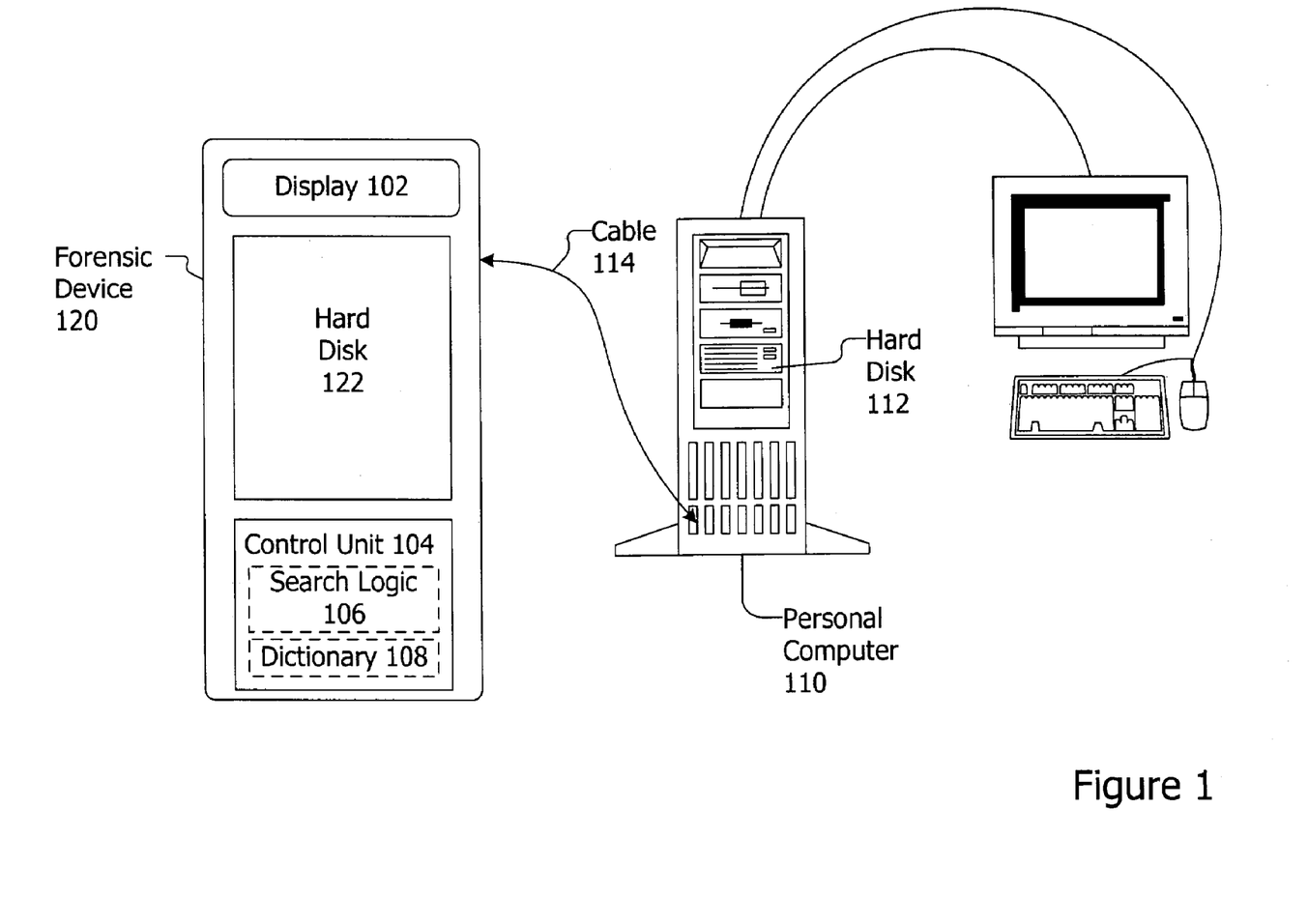
FIG. 1 is a block diagram of a system in accordance with the invention.

FIG. 1 is a block diagram of a system in accordance with the invention. In this embodiment, a forensic device 120 is coupled to a personal computer 110. In this embodiment, an investigator or other person may learn in real-time whether any of a dictionary of search terms 108 are included in a data stream formed when the contents of a suspect's storage device (hard disk 112) are being copied to an investigator's storage device (hard disk 122).

As used herein, "storage medium" refers to any means for storing data including magnetic disks such as hard disks and floppy disks, optical disks such as readable and writeable compact disks (CD-RW) and digital versatile disks (DVD-RW), magnetic tape, and solid state flash memory cards such as, for example, CompactFlash brand memory cards, MultiMediaCard cards, SmartMedia brand memory cards, SD brand memory cards, Memory Stick brand memory sticks, flash memory drive devices, and any other readable and writeable storage media. As used herein, a "storage device" is a device that allows for reading from and writing to a storage medium. A storage device may include a storage medium, such as in the case of, for example, a hard disk drive and a CD drive. The storage device may be included with or otherwise coupled or attached to a computing device.

A "computing device" as used herein refers to any device with a processor that may execute instructions including, but not limited to, personal computers, server computers, computing tablets, set top boxes, video game systems, cellular telephones, personal digital assistants (PDAs), forensic analysis devices, portable computers, and laptop computers. These computing devices may run any operating system, such as, for example, any variation of the Microsoft Windows operating system, Linux, Unix, and others.

The forensic device 120 is coupled to personal computer 110 via a cable 114. In one embodiment, forensic device 120 allows a user of personal computer 110 to copy data from a storage device such as hard disk 112 from a suspect's personal computer to a storage device such as hard disk 122 coupled in a forensic device 120. An example of a forensic device 120 is the SF-5000 manufactured by Logicube, Inc. of Chatsworth, Calif.

Cable 114 may be a Universal Serial Bus (USB) cable, an IEEE 1394 (more commonly known by the registered trademark Firewire) cable, or may conform to any data transfer standard, including, but not limited to the Advanced Technology Attachment (ATA), ATA Packet Interface (ATAPI), serial ATA, Integrated Drive Electronics (IDE), Enhanced IDE (EIDE) small computer system interface (SCSI), Personal Computer Memory Card International Association (PCMCIA), Fibre Channel, Ethernet/IEEE 802.3, and their variants. In addition, wireless communications may be used to couple forensic device 120 to personal computer 110. The wireless communications may conform to any standard or protocol, including, for example, IEEE 802.11 (also known as Wi-Fi), IEEE 802.16, Bluetooth, and others.

The hard disks 112 and 122 may be in any format, such as, for example, File Allocation Table 16 bit (FAT-16), FAT-32, new technology file system (NTFS), and Hierarchical File System (HFS) formats. In other embodiments, the hard disks 112 and 122 may be any storage device.

The forensic device 120 includes a control unit 104, search logic 106 and a dictionary 108. Search logic 106 and dictionary 108 may be included in control unit 104.

Control unit 104 may direct the data transfer and other functionality of the forensic device 120. Control unit 104 may be a programmable logic device (PLD), a field programmable gate array (FPGA), an application specific integrated circuit (ASIC), a combination thereof, or one or more other devices.

Search logic 106 allows for real-time searching of the data stream formed when the data from hard disk 112 is transferred through forensic device 120 to the hard disk 122 in forensic device 120. Search logic 104 determines whether any of the search terms in dictionary 108 are found in the real-time data stream. That is, search logic 104 searches the data stream in real-time to determine whether any of the search terms are present in the data stream. This searching may be referred to as matching.

The dictionary 108 may be included in a flash memory device in forensic device 120. The dictionary 108 may also be included in other storage devices included in the forensic device 120 such as, for example, a programmable read-only memory (PROM).

Dictionary 108 may be pre-loaded or factory installed in the control unit 104. In another embodiment, dictionary 108 may be created by a user of the forensic device 120. A user may create dictionary 108 on the forensic device or may create dictionary 108 on a host computing device and download the dictionary 108 to the forensic device 120. The creation of and downloading of the dictionary may be controlled by control unit 104 and/or software on a host computing device such as a personal computer. Multiple dictionaries may be provided by the manufacturer or seller of the forensic device 120. The dictionaries may be constructed according to investigative categories. Example categories include white collar crime, securities fraud, illegal drug sales/use, sex crimes, and others. An example illegal drug sales/use dictionary may include the search terms marijuana, cocaine, heroin, Quaalude®, crank, and others. A user of the forensic device 120 may select which dictionary the search logic 106 should use when analyzing a data stream.

In one embodiment, the minimum recommended number of characters in search terms is five because shorter search terms (e.g., three and four characters) yield an excessive number of matches such that the results of the search are not as useful.

The number of search terms in the dictionary 108 and the maximum number of characters per search term, the length of the search terms, may be any size. The maximum number of characters per search term is referred to herein as the maximum search term length. The number of search terms in the dictionary 108 is referred to herein as the dictionary size. The maximum number of search terms in the dictionary 108 is referred to herein as the maximum dictionary size. The maximum dictionary size and the maximum search term length may be factory set, may be set by the seller or distributor, and may be user customizable.

When a desired search term is longer than the maximum search term length, a shortened version of the search term may be input by a user, or the search term may be automatically truncated. For example, when the maximum search term length is eight and the desired search term is "methamphetamine," the search term is truncated to "methamph." In one embodiment, the number of characters per search term in the dictionary 108 is unlimited, but on the first (or leftmost) N characters are used in the search. That is, when the search terms in the dictionary are longer than the maximum search term length, the search terms are automatically truncated when the search based on the dictionary is performed.

In one embodiment, when a user enters a search term into the dictionary 108, the control unit 104 augments the dictionary 108 or augments the search based on the dictionary 108 by automatically adding or searching for common misspellings of search terms included in the dictionary 108.

Display 102 may be included in the forensic device 120. Display 102 may be a liquid crystal display (LCD) or other display. Display 102 may display a search term from the dictionary 108 when the search term is found in the data stream. Additional information may also be presented on the display 102.

In another embodiment, the invention allows for real-time monitoring of the contents of a data stream. The invention may be implemented such that the control logic, search logic and dictionary are located in a data transfer controller, a data communications controller, a network interface card (NIC), or other hardware device such as, for example, a USB host controller, an IEEE 1394 controller, an IDE controller, an ATA controller, a SCSI controller, an IEEE 802.3 network port, an IEEE 802.11 controller, an IEEE 802.16 controller, a Bluetooth controller, and others. The hardware device or controller may be located at an endpoint of a data stream, and may be included along any portion of a data stream.

Figure 2:
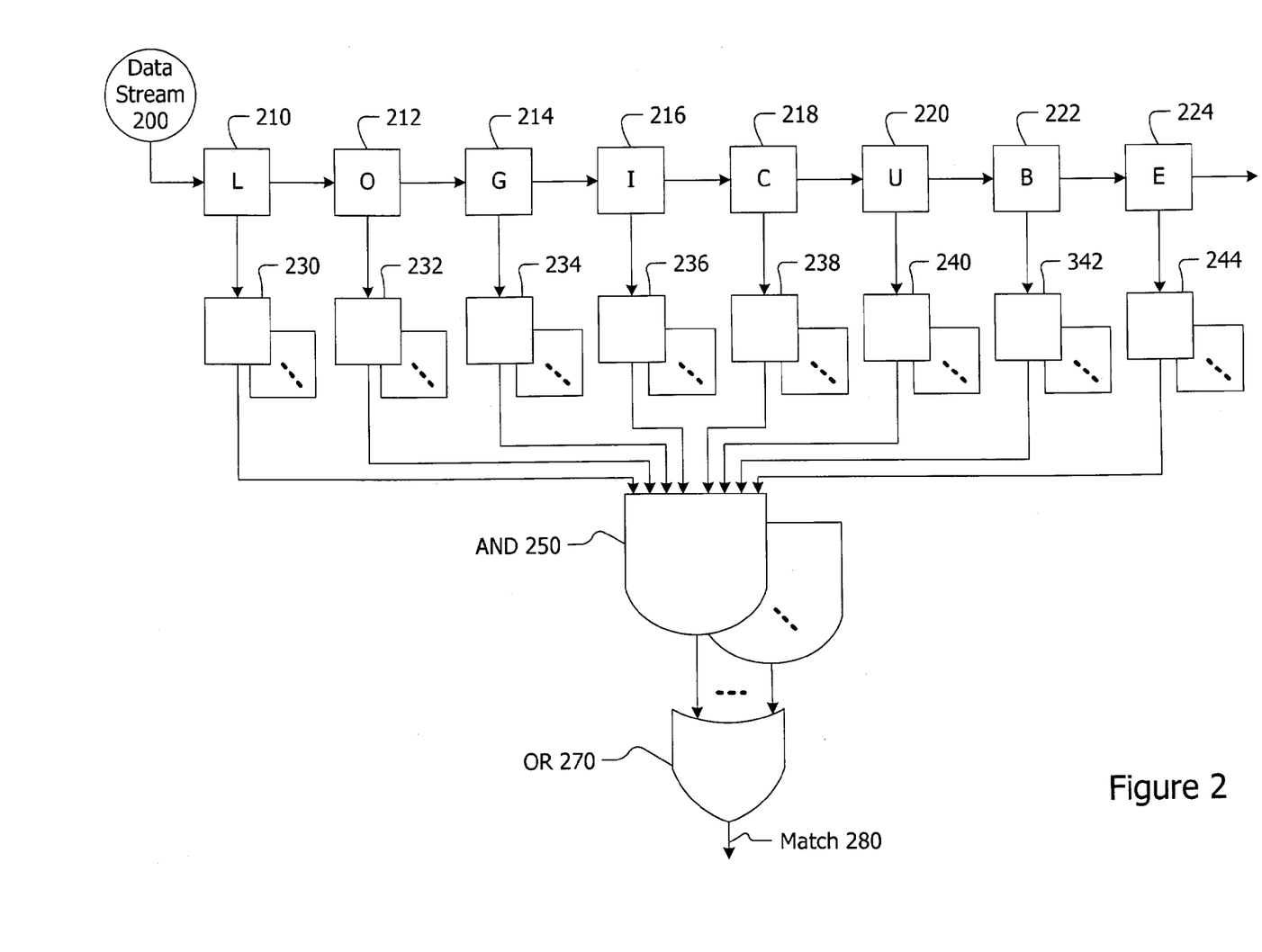
FIG. 2 is a logic diagram in accordance with the invention.

FIG. 2 is a logic diagram in accordance with the invention. The data stream 200 is comprised of bits of data. The bits of data may be aligned as 8 bit characters in 16 bit words. The 8 bit characters may conform to the American Standard Code for Information Interchange (ASCII) or American National Standards Institute (ANSI) character representations. Alternatively, the bits of data may be aligned as 16 bit characters in 16 bit words. The 16 bit characters may conform to the Unicode standard of character representation. In other alternatives, the word sizes may be 8, 16, 24, 32, 64, 128 bits, and other sizes. In various embodiments, characters included in the bit stream are represented in the ASCII, ANSI, Unicode and other representations, which may be 8 bit, 16 bit, and other bit sizes. The size of the words in the data stream and the number of bits in a character representation may be based on the data storage standards of either or booth of the storage devices involved in the data transfer, or may be dependent on the communications or data transfer standard of the data stream.

The characters in the data stream 200 enter a group of shift registers 210 through 224, one word at a time. The sequence of characters beginning with the character in shift register 210 and continuing through shift register 224 may be referred to as the current term. In an embodiment in which the word size of the data stream 200 is 16 bits, the shift register 210 is 16 bits wide. As shown in FIG. 2, the shift register 210 is 16 bits wide and the characters in the data stream 200 are 16 bit character representations. In this embodiment, the size of the shift register 210 in bits corresponds to the word size of the data stream 200. The search logic shown in FIG. 2 may be used whenever the word size of the data stream corresponds to the size of the shift registers in bits. For example, the search logic shown in FIG. 2 may also be used with bit words in data stream 200 and the size of the shift registers is 8 bits.

In one embodiment, when the word size of the data steam is 16 bits and the character representation is an 8 bit character representation, each 16 bit shift register holds two characters. This is discussed in detail below regarding FIG. 4.

For each clock cycle in the data stream 200, the shift register 210 receives a current character from the data stream 200. During each successive clock cycle, the current character shifts right, and a new character is received and placed in shift register 210. Shift register 210 represents the first character of a current term to be looked up, and shift register 224 represents the eighth character of a current term to be looked up. The other shift registers hold, in order, the characters between the first and the eighth. Generally, in one embodiment, the number of shift registers corresponds to the maximum search term length in characters of terms in a dictionary of search terms.

The example current term shown in FIG. 2 is LOGICUBE. The current term may be identified by its data stream location such as having an offset or word position within the data stream 200. The current term may be identified as having a storage device location that designates a particular location on a source or suspect's hard disk or other storage device, such as, for example, by sector, track and/or cluster.

Each of the shift registers 210 through 224 are coupled to corresponding groups of memories 230 through 244.

Each of the groups of memories 230 through 244 may be preloaded with a look-up table. Each look-up table is indexed by a character from the alphabet. Each look-up table corresponds to a character at a location in a term being searched. Shift register 210 represents the first character of a term to be searched, and shift register 224 represents the eighth character of a term to be searched. The character in a particular shift register indexes look-up tables in a corresponding group of memories. More specifically, the character in shift register 210 indexes look-up tables in group of memories 230, the character in shift register 212 indexes look-up tables in group of memories 232, and so on through shift register 224 and group of memories 244.

Each of the memories in groups of memories 230 through 244 emit a found or not found, match or no match designation based on the input character. In one embodiment, this designation is a 1 for found and 0 for not found.

Figure 3:
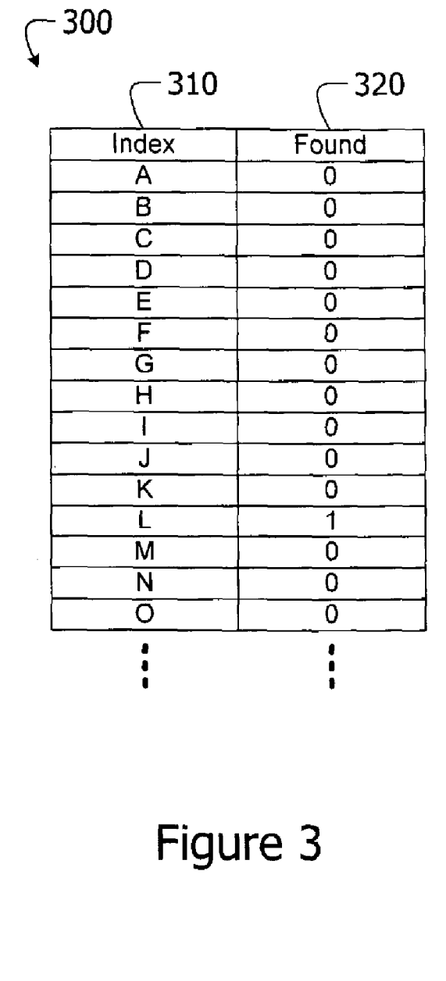
FIG. 3 is a look-up table in accordance with the invention.

FIG. 3 is a block diagram of example look-up table 300 in accordance with the invention. The look-up table 300 contains two columns. One column 310 contains the index to the table and the other column 320 represents the designation of whether the character that serves as the index is found in the current character position in a search term reflected by the look-up table. For example, if the search term in a dictionary is LOGICUBE and the look-up table represents the first character in the term, only an "L" will result in a 1 being issued by the memory, shown in the "L" row of look-up table 300. All other letters will result in a 0 being issued by the memory, as shown in the look-up table 300. Continuing with this example, a look-up table for the second character of the term LOGICUBE would list a 1 for the letter "O" and zeros for all other letters. And so on. In one embodiment, both cases (upper and lower) of a letter may resolve to a found designation such as, for example, 1.

Applying this example to the search logic in FIG. 2, look-up table 300 may be included in one of the memories in the group of memories 230. A look-up table in one of the memories of the group of memories 232 may be similar to the look-up table described in the preceding paragraph but with the letter "O" returning a 1. And so on.

In preparing a look-up table for each position in a search term, if the position for the search term includes a particular character, the particular character in the look-up table for that position is loaded with a 1 or other similar designation corresponding to match found. If a character is not in the position for the search term, the character in the look-up table is loaded with a 0 or other similar designation signifying match not found.

In one embodiment, the number of groups of memories corresponds to the maximum search term length in characters of the terms in the dictionary of terms to be searched. Similarly, the number of shift registers may correspond to the maximum search term length. For example, if the longest search term is 8 characters, then there will be 8 shift registers 210 through 224 and 8 groups of memories 230 through 244. In one embodiment, if the maximum search term length is N, then there will be N shift registers and N groups of memories.

In one embodiment, a dictionary includes up to 64 terms, and the number of letters in a term is eight. As such, in this embodiment, 64 memories are coupled to each of the shift registers. Each of the memories may be loaded with a look-up table. Each of the look-up tables is specific to a particular character location within a particular search term. Generally, if the dictionary of search terms has X terms, then each shift register will be coupled to X memories. That is, each of the groups of memories consists of X memories. Each of the memories is loaded with a look-up table. The look-up table corresponds to a particular character position in a particular search term. The memories may be physically configured in any arrangement.

For example, shift register 210 corresponds to the first character of the current term in the data stream. As such, shift register 210 is coupled to X memories, including a first memory having a look-up table for the first character of the first term, a second memory having a look-up table for a first character of the second term, etc., through X search terms. Shift register 212 corresponds to the second character of the current term. As such, shift register 212 is coupled to X memories, including a first memory having a look-up table for the second character of the first term, a second memory having a look-up table for the second character of the second term, etc., through X search terms. And so on, through N shift registers, where N is the maximum search term length in characters of a search term.

AND gates 250 receive the output of the groups of memories 230 through 244. That is, AND gates 250 receive the result of indexing each of the look-up tables in groups of memories 230 through 244. The number of inputs to each of the AND gates 250 corresponds to the maximum search term length. If the maximum search term length is N, there are N groups of memories, and each of the AND gates 250 has N inputs. Each AND gate 250 outputs a 1 if all of its inputs are 1, and 0 otherwise. That is, if each of the characters in the shift registers 210 through 224 indexes all of the corresponding memories 230 through 244 to resolve to a 1, then the search term is considered found in the data stream 200.

Just as the maximum dictionary size dictates the number of memories in each group of memories which are coupled to each shift register, the maximum dictionary size also dictates the number of AND gates. There is one AND gate for each of the search terms in the dictionary of search terms. When the maximum dictionary size is X and a dictionary of search terms includes X search terms, the number of AND gates 250 is X.

Each of the AND gates 250 is coupled to a single OR gate 270. OR gate 270 receives the output of AND gates 250 as input. As such, OR gate 270 has a number of inputs that corresponds to the number of AND gates. When the maximum dictionary size is X search terms, OR gate 270 has X inputs. When one of the AND gates 250 outputs a 1, OR gate 270 outputs a 1; when the outputs of all of the AND gates 250 are 0, OR gate 270 outputs a 0. Generally, OR gate 270 outputs a Boolean value signifying whether there is a match 270 of any of the search terms in the dictionary of search terms with the current term. When any of the search terms in terms in the dictionary of search terms matches the current term located in the shift registers 210–224, one of the AND gates 250 outputs a 1, and the value of match 280 is 1.

In addition to match 280, the search logic may output the search term, a search term identifier, and/or a location identifier such as a storage device location of the found term and/or a data stream location of the found term. Any or all of this information may be presented on the display of a forensic device.

Figure 4:
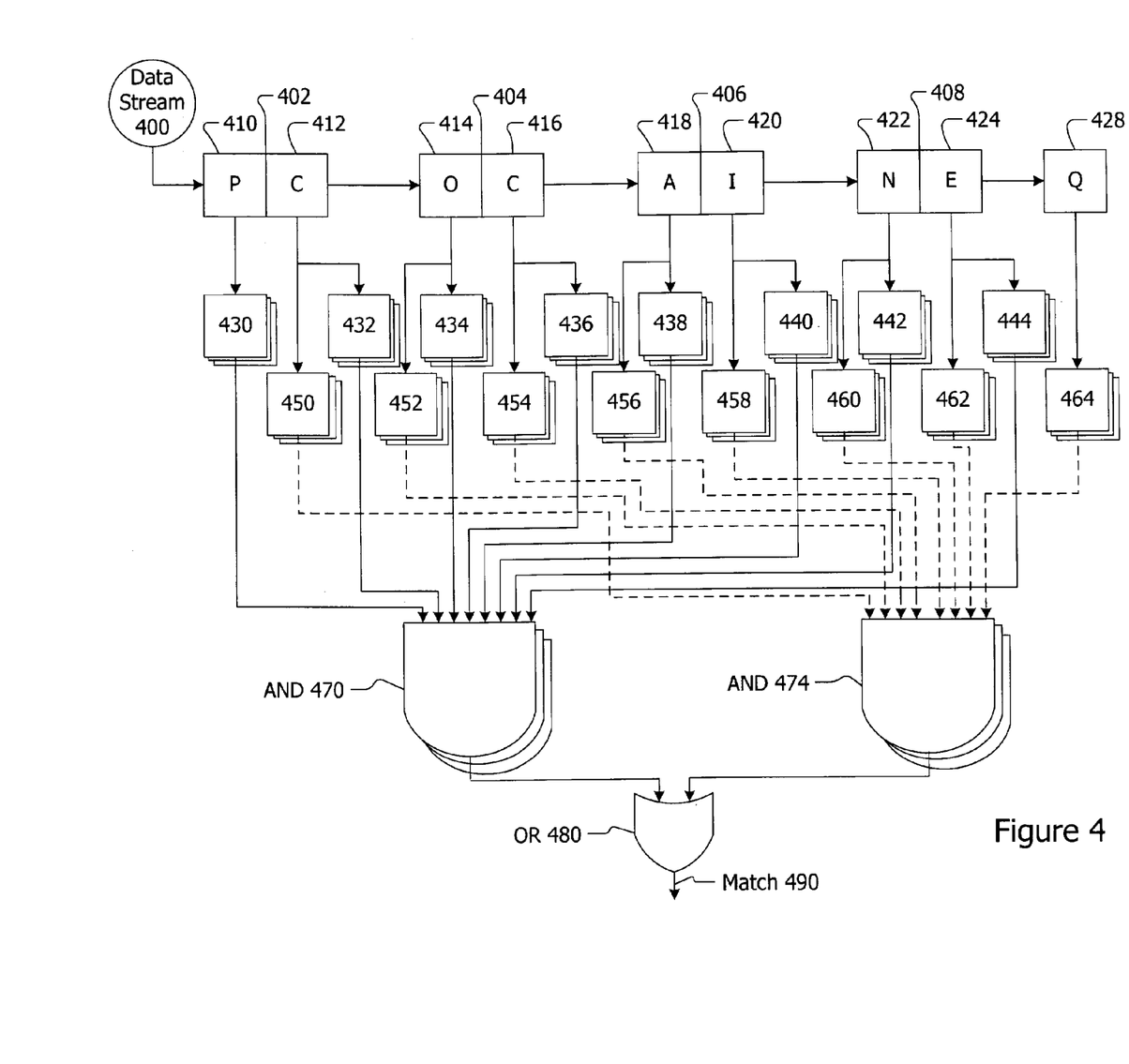
FIG. 4 is a second logic diagram in accordance with the invention.

FIG. 4 is a block diagram of a second hardware search logic in accordance with the invention. In this embodiment, a data stream 400 includes data that has a word size of 16 bits while the character representation is an 8 bit character representation. It follows that each shift register 410–428 is 8 bits wide, or that 16 bit shift registers 402–408 each hold two 8 bit characters. When 16 bit words in the data stream 400 are broken into 8 bit characters, search logic like that shown with regard to FIG. 4 may be used.

To keep the 16 bit words of the data stream intact and to help keep the speed of the real-time search of the data stream 400 in conformance with the speed of the data stream 400, 16 bit registers such as shift registers 402, 404, 406 and 408 may be used. In this embodiment, each shift register has a lower half and an upper half which correspond to bits 0 through 7 and eight through 15, respectively. Each of the upper and lower portions of the shift registers are referred to as shift registers. Shift register 402 includes shift registers 410 (upper portion) and 412 (lower portion), shift register 404 includes shift registers 414 and 416, and shift register 406 includes shift registers 418 and 420.

In another embodiments in which the data stream word size is 32 bits and the character representation is a 16 bit character representation, the shift registers are 32 bits wide and each include two 16 bit characters. In such an embodiment, the search logic in FIG. 4 may be used as shown.

In other embodiments in which the word size is 32 or 64 bits and the character representation is an eight bit character representation, the shift registers may include 8 bit portions. For example, 4 characters are included in each shift register when the data stream word size is 32 bits and the character representation is 8 bits. Similarly, 8 characters are included in each shift register when the data stream word size is 64 bits and the character representation is 8 bits. In another embodiment in which the word size is 64 and the character representation is 16 bits, the shift registers may include four 8 bit portions such that four characters are included in each shift register. Other word sizes and shifter register sizes may also be used.

As in FIG. 2, each of the shift registers 410 through 424 is coupled to a group of memories, each of the memories including a look-up table. However, when the words in the data stream are 16 bits wide and the character representation is 8 bits, the first letter of a search term may begin in the lower portion of shift register 402. This condition is referred to as misalignment. When a term is misaligned, the first letter of the current term may begin in the lower portion of the first shift register, for example, shift register 412. As shown in shift registers 410–428 of FIG. 4, the term COCAINE may be included in the input stream, but may be misaligned. As shown, the current term is PCOCAINEQ. The term COCAINE is preceded by the letter "P" and succeeded by the letter "Q".

So that the search logic can search for search terms that are misaligned, each of shift registers 412 through 428 are coupled to groups of memories 450 through 464. Groups of memories 450 through 464 contain copies of the look-up tables included in groups of memories 430 through 444. Groups of memories 450–464 are referred to herein as misaligned memories.

By having a first group of memories and a second group of misaligned memories, while the search logic is determining whether the term COCAINE is included in the current eight characters of the data stream, the search logic also determines whether the term COCAINE is included in a misaligned form in the data stream. This is achieved by evaluating the character found in the lower portion of the first word in the data stream located in shift register 412, and the characters in shift registers 414 through 424. So that the full term length (that is, the number of character corresponding to the maximum search term length) may be evaluated, the upper portion of a fifth word in the data stream, the ninth character, is maintained in a single, additional eight bit shift register 428. In one embodiment, the total size of the shift registers is nine bytes—that is, four 16 bit shift registers and one 8 bit misaligned/additional shift register.

The maximum dictionary size dictates the number of memories in each group of memories and the number of memories in each group of misaligned memories. If the maximum dictionary size is X terms, the number of memories coupled to each shift register 410–424 is X, and the number of misaligned memories coupled to each shift register 412–428 is X. In one embodiment, the maximum dictionary size is 64 terms, and, as such, there are 64 memories in each group of memories and 64 memories in each group of misaligned memories. For example, each of the 64 memories in the group of memories 430 is coupled to receive input from shift register 410. For example, each of the 64 misaligned memories in the group of misaligned memories 450 is coupled to receive input from shift register 412. The memories and the misalgned memories may be physically configured in any arrangement. In one embodiment, the memories and the misaligned memories are implemented in 16 blocks of 256×32 random access memory (RAM).

The logic circuit in FIG. 4 functions in generally the same way as the logic circuit described above with regard to FIG. 2, just multiplied by two to account for misalignment.

AND gates 470 receive as input the output of each of the groups of memories 430 through 444, and AND gates 474 receive as input the output of each of the groups of misaligned memories 450 through 464. AND gates 470 and 474 operate concurrently, coincidently. The number of search terms in the dictionary dictates the number of AND gates in each group of AND gates. In each of the groups of AND gates 470 and 474, there is one AND gate for each of the search terms in the dictionary of search terms. When the maximum dictionary size is X search terms, the number of AND gates 470 is X and the number of AND gates 474 is X. In an embodiment in which the dictionary of search terms includes 64 search terms, the search logic includes 64 AND gates 470 and 64 AND gates 474.

Each of the AND gates 470 and 474 are coupled to an OR gate 480. OR gate 480 receives the output of AND gates 470 and 474 as input. As such, OR gate 480 has a number of inputs that corresponds to the total number of AND gates 470 and 474. When maximum dictionary size is X search terms, OR gate 480 has 2X inputs. When one of the AND gates 470 and 474 outputs a 1, OR gate 480 outputs a 1; when the outputs of all of the AND gates 470 and 474 are 0, OR 270 outputs a 0. Generally, OR gate 480 outputs a Boolean value signifying whether there was a match 490. When any of the search terms in the dictionary of search terms matches the current term located in the shift registers, either 410 through 424 or 412 through 428, one of the AND gates 470 and 474 outputs a 1, and the value of match 490 is 1.

Figure 5:
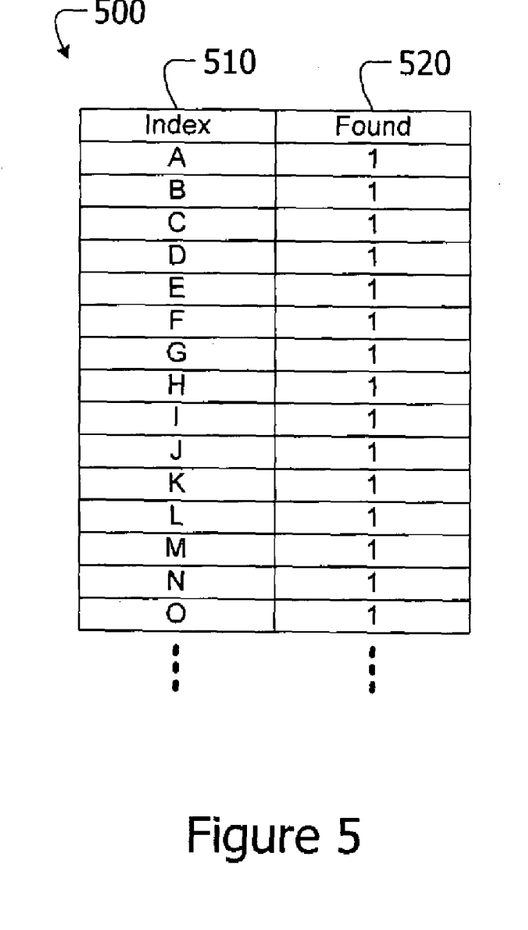
FIG. 5 is a second look-up table in accordance wit the invention.

FIG. 5 is a block diagram of a second look-up table 500 in accordance with the invention. In the situation where a search term is shorter than the maximum number of characters, the characters in the positions which are not used amount to "don't cares." That is, for example, if the term searched for is the seven character COCAINE, the look-up table for the eighth character is comprised solely of found designators. More specifically, for each character in the alphabet, when that character is used as an index 510 into the look-up table 500, the corresponding found bit is 1. As shown in FIG. 4, when monitoring the data stream 400 to determine whether the term COCAINE is included in the data stream, the search logic will return a found for the eighth character position, regardless of what character is in shift register 424 or 428. The look-up table 500 corresponds to a look-up table that would be included in one of the memories in the group of memories 444 and in one of the memories in the group of misaligned memories 464 of FIG. 4.

A forensic device including the invention described herein may allow a user to enter terms that include wildcards. A wildcard is equivalent to a "don't care" such that one or more characters of the term in a look-up table are loaded with a found designator such as 1. A wildcard single character or sequence of characters may be designated by an asterisk (*), a percent sign (%) or other symbol. A wildcard may be allowed for the beginning portion of a search term (e.g., *meth or %%%% meth), an ending portion of a search term (e.g., meth % or meth****), or for a particular letter in a particular position, or a combination thereof.

The search logic described regarding FIGS. 2 and 4 allows for a real-time search to be conducted at the speed that the data stream is being communicated. The speed of the search is conducted at less than one clock cycle per word in the data stream.

The Methods

Figure 6:
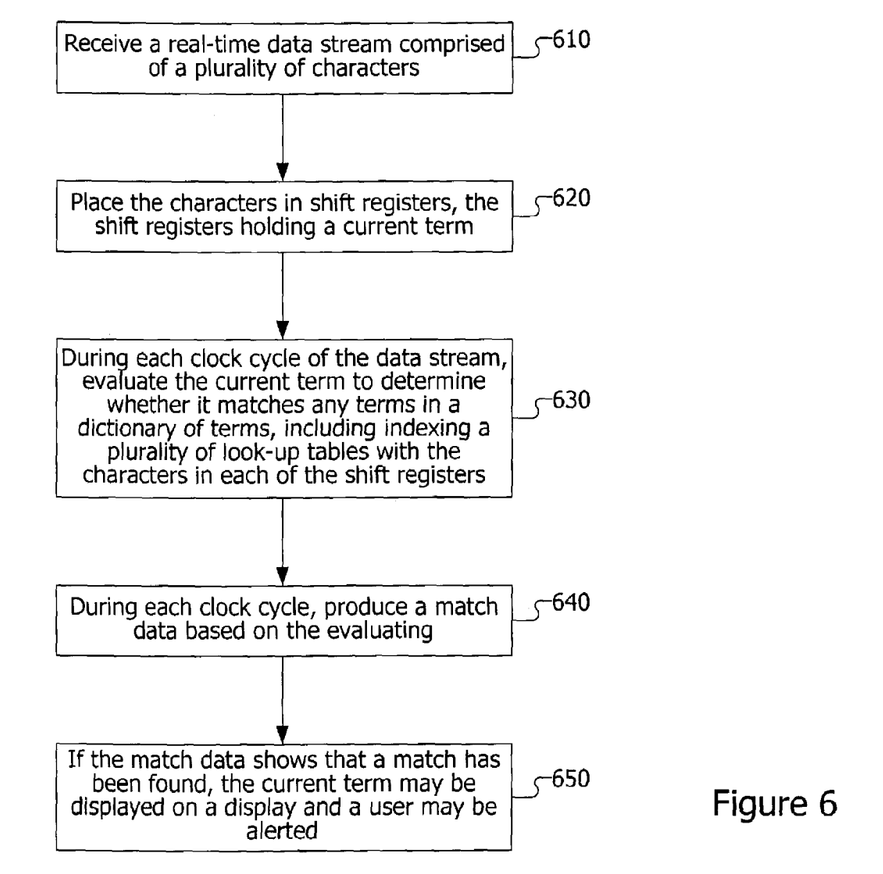
FIG. 6 is a flow chart of actions taken in accordance with the invention.

FIG. 6 is a flow chart of actions taken in accordance with the invention. A real-time data stream comprised of a plurality of characters is received, as shown in block 610. The characters are placed in shift registers, the shift registers holding a current term, as shown in block 620. The number of shift registers corresponds to a maximum search term length. A word of data (for example, 8, 16, 24, 32, 48, 64, 128 bits) from the data stream is received each clock cycle, and the characters are shifted each clock cycle. During each clock cycle of the data stream, the current term is evaluated to determine whether it matches any terms in a dictionary of terms, including indexing a plurality of look-up tables with the characters in each of the shift registers, as shown in block 630. More specifically, the contents of each of the shift registers is used to index each of a group of corresponding look-up tables, a size of each group of look-up tables corresponding to a maximum dictionary size. During each clock cycle, a match data based on the evaluating is produced, as shown in block 640.

If the match data shows that a match has been found, the current term (that is, the matched search term from the dictionary found in the data stream) may be displayed on a display and a user may be alerted, as shown in block 650. A visual, aural or other alert may be activated when a match is found. To provide a visual alert, the forensic device 120 may be augmented with one or more light emitting diodes (LEDs), may flash information on an LCD, etc. The forensic device 120 may also be augmented with a buzzer, speaker, or other device to issue an aural alert. In addition, when a search term is found in the data stream, the current term may be added to a search terms found list which may be maintained on the forensic device 120 by search logic 106 or other component of control unit 104. The search terms found list may include a tally as to how many times the found search terms were matched in the real-time data stream. The search terms found list may be accessed by a user of the forensic device 120 during and/or after the real-time search.

Although the methods and apparatus described herein allow for hardware real-time search, the method and apparatus may be emulated and/or implemented in software that is stored on a storage device and is executed by a processor. The methods may be implemented in a forensic device or any computing device.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

The invention claimed is:

1. A real-time searching device comprising:
a plurality of shift registers a number of shift registers corresponding to a maximum search term length plus one to accommodate for a misalignment condition, the shift registers including a first shift register and an additional shift register, the plurality of shift registers to receive a data stream of characters;
a first plurality of memory units arranged in groups, a number of groups of the first plurality of memory units corresponding to the maximum search term length, each group of the first plurality of memory units having a number of memory units corresponding to a maximum dictionary size, each of the first plurality of memory units coupled to one of the shift registers except for the additional shift register, each of the first plurality of memory units indexed by a character in the shift register to which the memory unit is coupled, the first plurality of memory units to store a dictionary of search terms;
a second plurality of memory units arranged in groups, a number of groups of the second plurality of memory units corresponding to the maximum search term length, each group of the second plurality of memory units having a number of memory units corresponding to the maximum dictionary size, each of the second plurality of memory units coupled to one of the shift registers except for the first shift register, each of the second plurality of memory units to be indexed by the character in the shift register to which the memory unit is coupled, the second plurality of memory units to store the dictionary of search terms;
a first plurality of AND gates corresponding to the maximum search term length, each of the first plurality of AND gates coupled to receive input from one of each of the groups of the first plurality of memory units;
a second plurality of AND gates corresponding to the maximum search term length, each of the second plurality of AND gates coupled to receive input from one of each of the groups of the second plurality of memory units; and
an OR gate to receive input from each of the first and second plurality of AND gates, the OR gate to output a match data.

2. The real-time searching device of claim 1 wherein each of the groups of the first and second plurality of memory units include a look-up table to be indexed by the character in the shift register to which the memory unit is coupled, the look-up tables based on the dictionary of search terms.

3. A computing device including the real-time searching device of claim 1.

4. A forensic device including the real-time searching device of claim 1.

5. A network interface card including the real-time searching device of claim 1.

6. A host controller including the real-time searching device of claim 1.

7. A method of searching the contents of a data stream in real-time comprising:
  receiving in real-time a data stream comprised of a plurality of characters;
  placing a current term from the data stream in shift registers, a number of shift registers corresponding to a maximum search term length plus one to accommodate for a misalignment condition, the shift registers including a first shift register and an additional shift register;
  matching the current term from the data stream against a dictionary of terms stored as groups of look-up tables in memory devices coupled to the shift registers, the memory devices including;
    a first plurality of memory units arranged in groups, a number of groups of the first plurality of memory units corresponding to the maximum search term length, each group of the first plurality of memory units having a number of memory units corresponding to a maximum dictionary size, each of the first plurality of memory units coupled to one of the shift registers except for the additional shift register, each of the first plurality of memory units indexed by a character in the shift register to which the memory unit is coupled, the first plurality of memory units to store the dictionary of terms;
    a second plurality of memory units arranged in groups, a number of groups of the second plurality of memory units corresponding to the maximum search term length, each group of the second plurality of memory units having a number of memory units corresponding to the maximum dictionary size, each of the second plurality of memory units coupled to one of the shift registers except for the first shift register, each of the second plurality of memory units to be indexed by the character in the shift register to which the memory unit is coupled, the second plurality of memory units to store the dictionary of terms;
  the matching achieved by:
    a first plurality of AND gates corresponding to the maximum search term length, each of the first plurality of AND gates coupled to receive input from one of each of the groups of the first plurality of memory units;
    a second plurality of AND gates corresponding to the maximum search term length, each of the second plurality of AND gates coupled to receive input from one of each of the groups of the second plurality of memory units;
    an OR gate to receive input from each of the first and second plurality of AND gates, the OR gate to output a match data; and
  providing a notification when a match is found, the match comprising the match data.

8. The method of claim 7 wherein
  the placing comprises placing the characters in the shift registers,
  the matching comprises evaluating during each clock cycle of the data stream whether the current term matches any terms in the dictionary of terms, including indexing the groups of look-up tables stored in the memory devices with the characters in each of the shift registers, and
  outputting the match data based on the evaluating.

9. The method of claim 8 wherein the indexing comprises:
  for each shift register, indexing each of the groups of look-up tables in the memory devices coupled thereto, each group of look-up tables corresponding to a character position of the current term.

10. The method of claim 7 wherein the providing comprises displaying the current term on a display.

11. The method of claim 7 further comprising:
  adding the current term to a search terms found list when a match is found.

12. The method of claim 7 further comprising:
  issuing an alert when a match is found.

13. A real-time searching device comprising:
  a dictionary of terms having a maximum character length of eight;
  nine shift registers to receive a data stream, the nine shift registers including a first shift register, a second shift register, an eighth shift register, and a ninth shift register;
  a plurality of memory units arranged as eight groups of 64 memory units, the memory units to store the dictionary, each of the eight groups of memory units to receive the contents of a corresponding one of the first through eighth shift registers as input, each of the first plurality of memory units to store look-up tables, the look-up tables based on the dictionary, the look-up tables to be indexed by a character in the corresponding one of the first through eighth shift registers, each of the memory units providing output based on the shift register indexing the corresponding look-up table;
  a plurality of misaligned memory units arranged as eight groups of 64 misaligned memory units, the plurality of misaligned memory units to store the dictionary, each of the eight groups of misaligned memory units to receive the contents of a corresponding one of the second through ninth shift registers as input, each of the misaligned memory units to store look-up tables, the look-up tables based on the dictionary, the look-up tables to be indexed by a letter in one of the corresponding second through ninth shift registers, each of the misaligned memory units providing output based on the shift register indexing the corresponding look-up table in the misaligned memory unit;
  a first group of 64 AND gates and a second group of 64 AND gates, each AND gate in the first group of AND gates to receive input from each of the eight groups of memory units and each AND gate in the second group of AND gates to receive input from each of the eight groups of misaligned memory units; and
  an OR gate to receive input from the first group of 64 AND gates and the second group of 64 AND gates, the OR gate to output a match data.

* * * * *

UNITED STATES PATENT AND TRADEMARK OFFICE
CERTIFICATE OF CORRECTION

PATENT NO. : 7,082,425 B2 Page 1 of 1
APPLICATION NO. : 10/458555
DATED : July 25, 2006
INVENTOR(S) : Guy et al.

It is certified that error appears in the above-identified patent and that said Letters Patent is hereby corrected as shown below:

Column 1, Line 20: replace "modem" with "modern".

Signed and Sealed this

Seventh Day of November, 2006

JON W. DUDAS
*Director of the United States Patent and Trademark Office*